US011671913B2

(12) United States Patent
Song et al.

(10) Patent No.: US 11,671,913 B2
(45) Date of Patent: Jun. 6, 2023

(54) SYSTEMS AND METHODS FOR REDUCING BASE STATION POWER CONSUMPTION

(71) Applicant: Verizon Patent and Licensing Inc., Basking Ridge, NJ (US)

(72) Inventors: Lei Song, Basking Ridge, NJ (US); Jin Yang, Orinda, CA (US); Zheng Zhao, Plainsboro, NJ (US); Edward Diaz, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/364,204

(22) Filed: Jun. 30, 2021

(65) Prior Publication Data

US 2023/0007580 A1    Jan. 5, 2023

(51) Int. Cl.
*H04W 52/02* (2009.01)
(52) U.S. Cl.
CPC .............................. *H04W 52/0206* (2013.01)
(58) Field of Classification Search
CPC .................................................. H04W 52/0206
USPC ........................................................ 370/311
See application file for complete search history.

(56) References Cited

U.S. PATENT DOCUMENTS

| | | | |
|---|---|---|---|
| 8,611,268 B1* | 12/2013 | Thandaveswaran | H04W 52/0206 455/552.1 |
| 2012/0171978 A1* | 7/2012 | Sharma | H04B 1/1638 327/557 |
| 2013/0215788 A1* | 8/2013 | He | H04W 52/0258 370/253 |
| 2013/0336188 A1* | 12/2013 | Yomo | H04W 52/0206 370/311 |
| 2016/0029311 A1* | 1/2016 | Wolkowicki | H04W 52/0251 370/311 |
| 2022/0030515 A1* | 1/2022 | Berger | H04W 4/40 |

* cited by examiner

*Primary Examiner* — Gbemileke J Onamuti

(57) ABSTRACT

Systems and methods allow access stations to save power when no user equipment (UE) devices require service from the access station. The access station may enter a low power-consumption mode (or "sleep mode") when the access station is inactive. The access station transmits a beacon signal when in the low power-consumption mode to indicate to UE devices in a coverage area of the access station that the access station is in the low power-consumption mode. The access station receives a wake-up signal from a device and, in response, exits the low power-consumption mode.

20 Claims, 7 Drawing Sheets

SYSTEMS AND METHODS FOR REDUCING BASE STATION POWER CONSUMPTION

BACKGROUND

Development and design of radio access networks (RANs) present certain challenges from a network-side perspective, including increased power consumption of RAN components. Typically, wireless cell sites, also referred to as base stations or access stations, are turned on and consume full power to provide constant availability of service for wireless customers.

DETAILED DESCRIPTION OF EXAMPLE EMBODIMENTS

The following detailed description refers to the accompanying drawings. The same reference numbers in different drawings may identify the same or similar elements. Also, the following detailed description does not limit the invention.

Systems and methods described herein provide for power savings of access stations in Radio Access Networks (RANs), such as Fifth Generation New Radio (5G-NR) networks. Reducing power consumption of RAN components may lower environmental impact, increase component life, and provide operational cost savings. RAN access stations (e.g., next generation node Bs or gNBs) use power, for example, for amplification, baseband conversion, transmit/receive units, voltage conversion, filtering, etc.

Existing access stations for NR networks consistently send synchronization signals about every 20 milliseconds (ms), regardless of whether user equipment (UE) devices are connecting to the access station. This rate of recurrence precludes any temporary disabling of amplification, transmit/receive units, and other component of the access station for power saving purposes.

According to an implementation, a framework and methodology is provided to allow access stations to save power when no UE devices require service from the access station. The access station may enter a low power-consumption mode (or "sleep mode") that deactivates primary components of the access station when the access station is inactive (e.g., not serving any UE devices). A UE device may wake-up the access station if certain conditions are met. Furthermore, in another implementation, the access station may to continue to operate in a power-efficient way when serving a limited number of UE devices.

Figure 1:
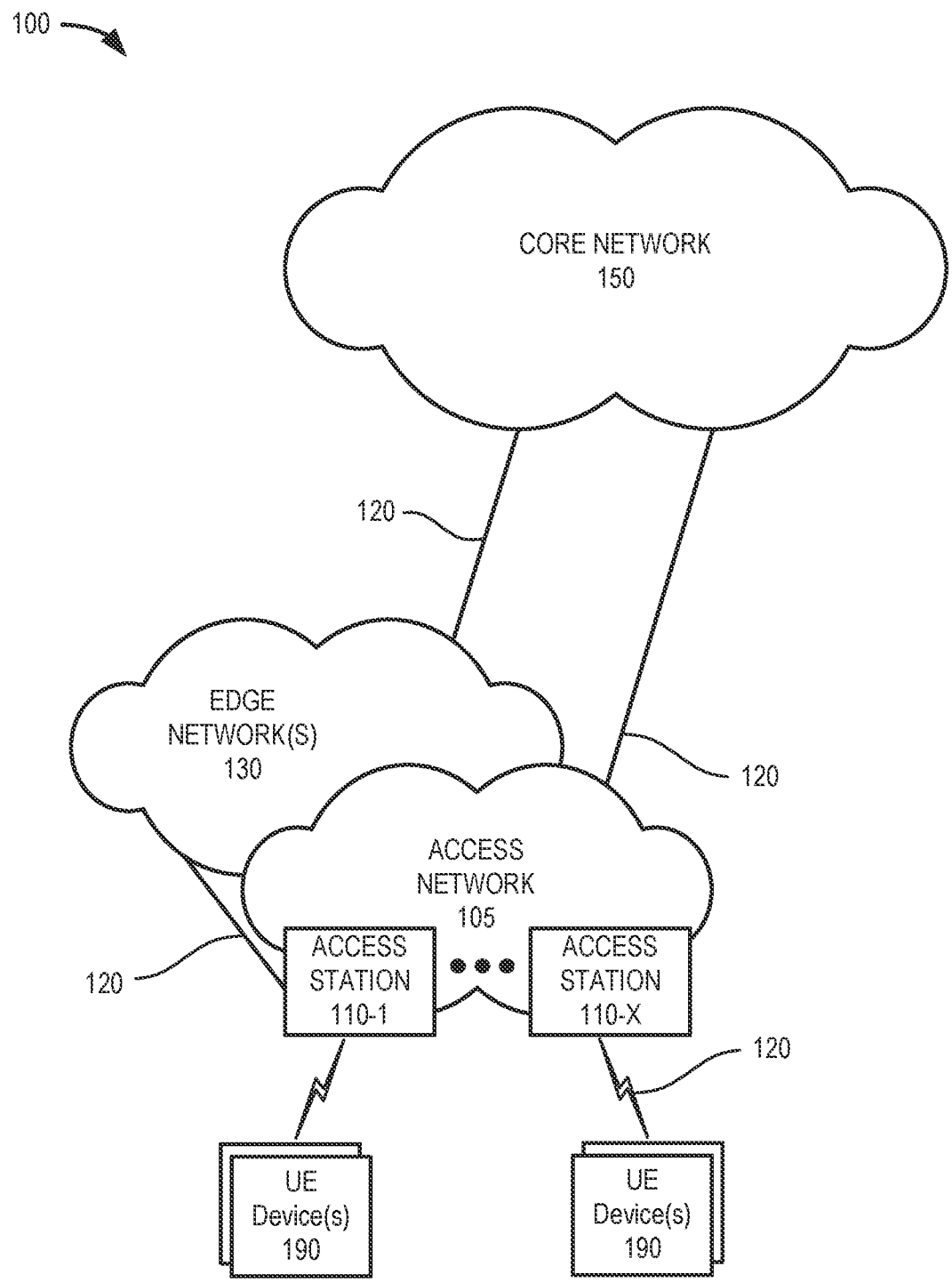
FIG. 1 illustrates an exemplary network environment in which a reduced power consumption base station described herein may be implemented.

FIG. 1 illustrates an exemplary environment 100 in which power-conserving access stations may be implemented. As illustrated, environment 100 includes an access network 105, one or more edge networks 130, and a core network 150. Access network 105 may include wireless access stations 110-1 through 110-X (referred to collectively as access stations 110 and generally as access station 110). Environment 100 further includes one or more UE devices 190.

The number, the type, and the arrangement of network devices and the number of UE devices 190 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links 120 between the networks, between the network devices, and between UE devices 190 and the network devices. Environment 100 may be implemented to include wired, optical, and/or wireless communication links 120 among the network devices and the networks illustrated. A connection via a communication link 120 may be direct or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 105 may include one or multiple networks of one or multiple types and technologies. For example, access network 105 may include a 5G RAN, a Fourth Generation (4G) RAN, and/or another type of future generation RAN. By way of further example, access network 105 may be implemented to include a 5G-NR RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to access stations 110 and/or core network 150.

Depending on the implementation, access network 105 may include one or multiple types of access stations 110. For example, access station 110 may include a next generation Node B (gNB) for a 5G NR RAN. In other implementations, access station 110 may include an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to various embodiments, access network 105 may be implemented according to various wireless technologies (e.g., radio access technology (RAT), etc.), wireless standards, wireless frequencies/bands, and so forth. According to an implementation, access stations 110 may include a gNB with multiple distributed components, such as a central unit (CU), a distributed unit (DU), a remote unit (RU or a remote radio unit (RRU)), or another type of distributed arrangement. Each access station 110 typically uses multiple carrier frequencies in a single instance. For example, a single access station 110 may provide coverage over an area referred to as a cell. According to implementations described herein, access station 110 may deactivate primary components to save power when access station 110 is not serving any UE devices (e.g., during off-peak periods). Access station 110 may include a power saving module to provide a low-power beacon by which UE devices 190 may recognize access station 110.

Edge network 130 includes a platform that provides application services at the edge of a network. For example, edge network 130 may be implemented as a Multi-access Edge Compute (MEC) platform. Edge network 130 may include network devices (not shown) located to provide geographic proximity to various groups of access stations 110. In some embodiments, components of edge network 130 may be co-located with access stations 110 of RAN 105. In other embodiments, access stations 110 may connect to edge network 130 via wired (e.g., optical) backhaul links 120.

Core network 150 may include one or multiple networks of one or multiple network types and technologies. For example, core network 150 may be implemented to include a next generation core (NGC) network for a 5G network, an Evolved Packet Core (EPC) of an LTE network, an LTE-A network, an LTE-A Pro network, and/or a legacy core network. Depending on the implementation, core network 150 may include various network components and devices, such as for example, a user plane function (UPF), an access and mobility management function (AMF), a session management function (SMF), a unified data management (UDM) device or function, an authentication server function (AUSF), a network slice selection function (NSSF), network data analytics function (NWDAF), and so forth.

UE devices 190 may each include a mobile device, such as wireless or cellular telephone device (e.g., a conventional cell phone with data processing capabilities), a smart phone, a personal digital assistant (PDA) that can include a radiotelephone, etc. In another implementation, UE device 190 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. In other implementations, UE devices 190 may be implemented as a machine-type communications (MTC) device, an Internet of Things (IoT) device, a machine-to-machine (M2M) device, etc., that includes communication functionality, such as a home appliance device, a home monitoring device, a camera, etc. UE devices 190 may connect to access stations 110 in a wireless manner. According to implementations described herein, UE device 190 may include logic to operate with power saving modules of access station 110. UE devices 190 may detect beacon signals from access stations 110 in sleep mode and provide wake-up signals to request service from an access station 110.

Figure 2:
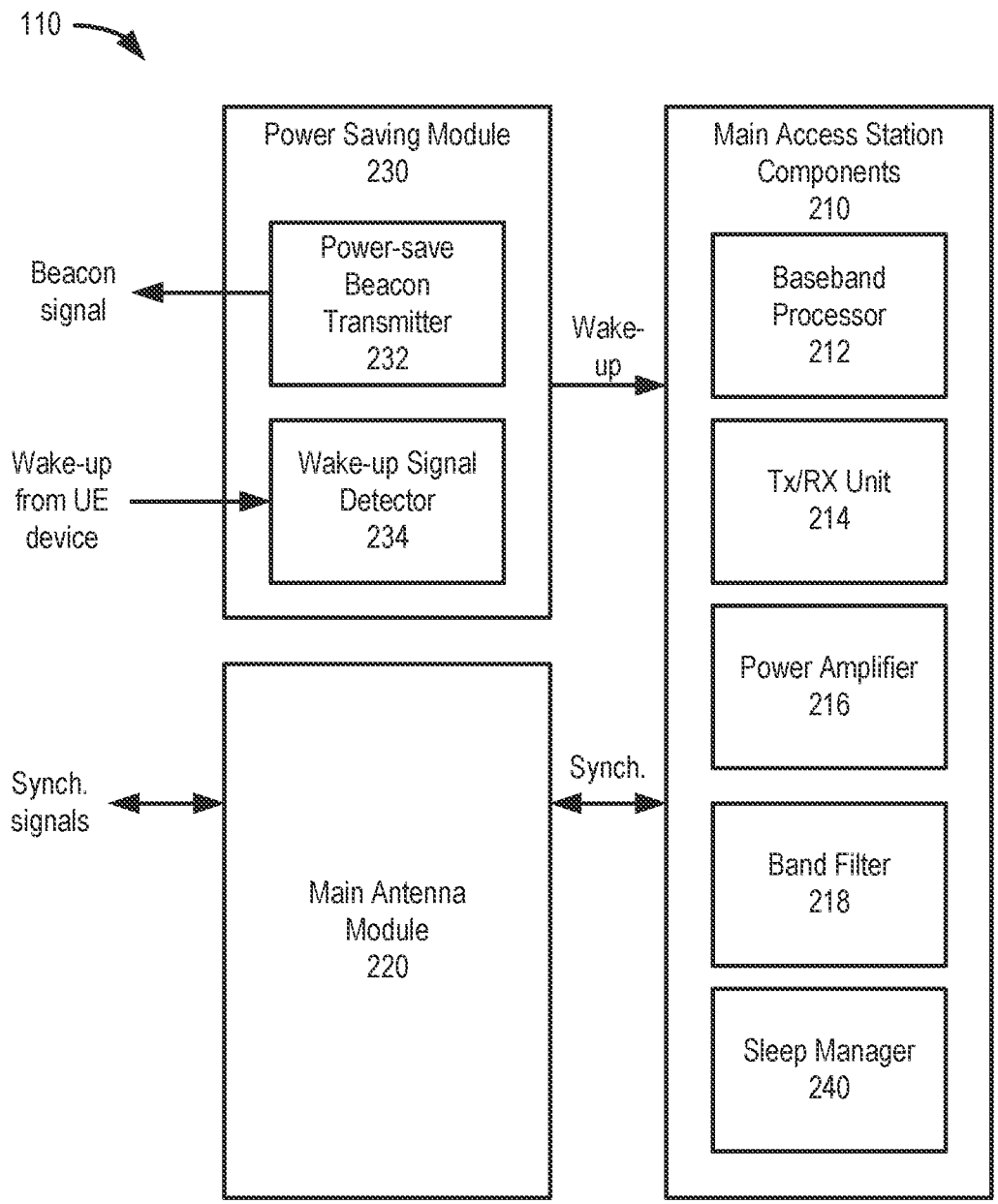
FIG. 2 illustrates exemplary logical components of an access station according to an implementation.

FIG. 2 is a diagram illustrating components of access station 110. As shown in FIG. 2, access station 110 may include main access station components 210, a main antenna module 220, and a power saving module 230. Main access station components 210 and main antenna module 220 may generally represent primary components that typically are responsible for the majority of the access station's power consumption.

Main access station components 210 may, in some implementations, be split into various components and located in a distributed fashion. Main access station components 210 may include a baseband processor 212, a transmit/receive (Tx/Rx) unit 214, a power amplifier 216, and a band filter 218. Main access station components 210 may collectively draw the majority of power consumption of access station 110. In some implementations, main access station components 210 may also include a sleep manager 240.

Baseband processor 212 includes a device (e.g., a chip or part of a chip) in a network interface that manages radio functions that require the use of main antenna module 220. Baseband processor 212 may include, in addition to other components, its own memory and software/firmware components.

Tx/Rx unit 214 may include a transmitter for transmitting data via one or more antennas of main antenna module 220 and a receiver for receiving data via one or more antennas of main antenna module 220. Power amplifier 216 may amplify signals transmitted, or received, via antennas of main antenna module 220. Power amplifier 216 may typically be the highest power-consuming component of access station 110.

Band filter 218 may pass frequencies within a particular band or group of bands from composite signal bands and may reject (or attenuate) frequencies in composite signal bands that are outside the particular band or group of bands.

In some embodiments, main access station components 210 may additionally include other components. For example, main access station components 210 may include air conditioning units, power conversion module, and/or other processing components (not shown), along with sleep manager 240 described further below.

Main antenna module 220 may include an array of antennas, such as, for example, a Full Dimension Multiple Input Multiple Output (FD-MIMO) or massive MIMO antenna array, that may form antenna beams in horizontal and/or vertical directions to enable each array of antennas to cover a three-dimensional space in the vicinity of each array. For example, each antenna array may include a number of horizontal antennas and a number of vertical antennas arranged in a row(s) and column(s) configuration. The antenna arrays may produce a wireless network coverage area within which UE devices 190 may transmit to, and receive from, main antenna module 220 via wireless transmissions. The wireless network coverage area may provide reliable wireless connections over a particular geographic area and have a certain maximum capacity and throughput.

According to implementations described herein, main access station components 210 and main antenna module 220 may enter into a low power-consumption mode or sleep mode when access station 110 is not serving any UE devices 190. While access station 110 is in sleep mode, power saving module 230 may provide a dedicated wake-up control for access station 110. Power saving module 230 may be activated, for example, while main access station components 210 and main antenna module 220 are in power saving (or sleep) mode. As shown in FIG. 2, power saving module 230 may include a power-save beacon transmitter 232 and a wake-up signal detector 234.

Power-save beacon transmitter 232 may include an electronic device to transmit one or more signals for receipt by UE devices 190. In one implementation, power-save beacon transmitter 232 may include a low-power transceiver for broadcasting a predetermined signal at periodic intervals and a battery or power connection for powering the transmitter. The signals transmitted by power-save beacon transmitter 232 indicate, for example, a regionally unique identifier value access station 110. Power-save beacon transmitter 232 may transmit a beacon signal indicating access station 110 is in a power saving mode. For example, power-save beacon transmitter 232 may transmit a single waveform or tone, using low power, that correlates to a wake-up signal. According to an implementation, the beacon signal may indicate to properly-configured UE devices 190 that access station 110 is in a power saving mode. The waveform of the beacon signal may identify, for example, a label for a particular access station (e.g., among multiple neighboring access stations in RAN 105). The label may correspond to, for example, a station ID or serial number of the access station 110. Additionally, the beacon signal may indicate a power-saving level for access station 110. The power-saving level may indicate, for example, a relative level of importance/priority for access station 110 to remain in power saving mode.

According to an implementation, power-save beacon transmitter 232 may include dedicated circuitry, such as a field-programmable gate array (FPGA) or an application-specific integrated circuit (ASIC) that may broadcast the beacon signal without activating main access station components 210 and main antenna module 220. The power consumption of power-save beacon transmitter 232 may operate, for example, on a rough scale of less than 1% (or less than 0.05%) of normal power consumption levels for access station 110. In other implementations, power-save beacon transmitter 232 may use software-based controls instead of dedicated circuitry.

Wake-up signal detector 234 may detect a wake-up signal sent by UE device 190. The wake-up signal may include, for example, a signal outside the scope or operating parameters of typical radio resource management (RRM) signaling. According to an implementation, the wake-up signal detector 234 may be implemented with an analog or low complexity digital signal energy (non-coherent) detector, which minimizes power consumption. Wake-up signal detector 234 may correlate a wake-up signal from a given signal pattern. Wake-up signal detector 234 may be configured, for example, to only detect a wake-up signal pattern and ignore other signal patterns. In response to detecting a wake-up signal from a UE device 190, wake-up signal detector 234 may activate main access station components 210 and main antenna module 220 to resume normal operation for access station 110.

Sleep manager 240 may manage powering down and powering up components of access station 110 for power savings. Sleep manager 240 may be included within main access station components 210 (as shown in FIG. 2), within power saving module 230, or as a separate component. Sleep manager 240 may detect periods of inactivity and initiate a low power/sleep mode for access station 110. According to an implementation, sleep manager 240 be configured to only initiate a sleep mode during certain time periods (e.g., night time, weekends, etc.) based on learned usage patterns for access station 110. Sleep manager 240 may also respond to a wake-up signal from power saving module 230 to initiate a wake-up sequence for access station 110.

According to an implementation, sleep manager 240 may cause individual components of main access station components 210 to resume operation gradually as needed during an access procedure from the UE device 190. Additionally, if a wake-up signal from a single UE device provides device-type information, sleep manager 240 may have access station 110 provide cell search (e.g., primary synchronization signals (PSS), secondary synchronization signals (SSS), etc.) and/or system information (SI) directed for the UE device 190. When there are only one or a few UE devices 190 with low data rate applications, sleep manager 240 may direct access station 110 to turn-off all common channels (e.g., PSS, SSS, SI, etc.) and only offer dedicated signals to the UE device(s) currently in service. In this context, power-save beacon transmitter 232 may continue to transmit a beacon signal to indicate its presence to new UE devices in the cell.

In still other implementations, sleep manager 240 may redirect UE device 110 to another cell (access station) based on signal measurements for power saving purposes. In yet another implementation, an active (awake) access station may track a UE device 190 heading into the cell of an access station in sleep mode. The active access station may provide a wake-up signal to the sleeping access station in anticipation of handing over the UE device to the other cell.

The configuration of the components of access station 110 depicted in FIG. 2 is for illustrative purposes only, and other configurations may be implemented. Therefore, access station 110 may include additional, fewer and/or different components, that may be configured differently, than depicted in FIG. 2. For example, in another implementation, some or all of power saving module 230 may be incorporated into main access station components 210.

Figure 3:
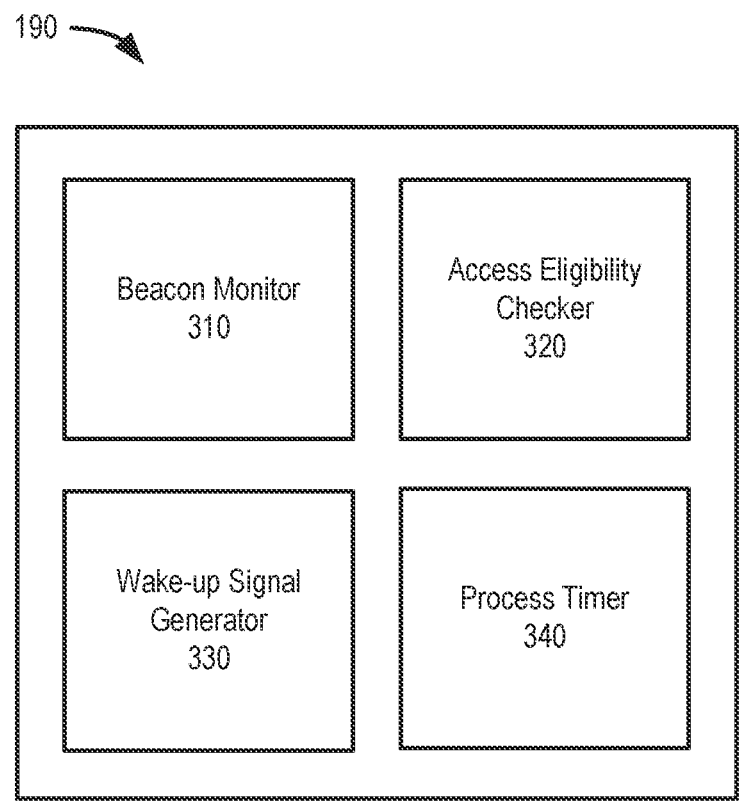
FIG. 3 is a block diagram illustrating exemplary logical components of a UE device according to an implementation.

FIG. 3 is a diagram illustrating logical components of UE device 190. As shown in FIG. 3, UE device 190 may include a beacon monitor 310, an access eligibility checker 320, a wake-up signal generator 330, and a process timer 340. According to an implementation, beacon monitor 310, access eligibility checker 320, wake-up signal generator 330, and process timer 340 may be implemented as software or firmware in UE device 190.

Beacon monitor 310 may search for beacon signals (e.g., from power-save beacon transmitter 232) to detect access stations 110 in sleep mode. Beacon monitor 310 may operate separately from and/or in addition to normal RRM signaling. According to an implementation, beacon monitor 310 may detect multiple beacon signals from different access stations 110 in sleep mode.

Access eligibility checker 320 may include logic to determine if UE device 190 is authorized to wake up an access station 110. For example, upon detecting the presence of a sleeping access station 110, access eligibility checker 320 may perform an access eligibility check to determine if UE device 190 is eligible to wake up a particular access station 110. According to an implementation, access eligibility checker 320 may be included within a unified access control (UAC) framework for 5G networks. In a UAC scenario, UE device 190 may be assigned an access identity number (AIN) that may indicate an access class configured for the end device, such that only certain AINs are authorized to wake up an access station. As an example, a stationary MTC device for non-critical information may be assigned to an access class that would not be eligible to wake up an access station.

While existing access control focuses on network capacity and differentiating the UE devices, in a new UAC scenario, the access station power-saving level may be added as a consideration factor. The power saving level information from the beacon signal may influence whether UE device 190 is eligible to wake up a particular access station 110. Additionally, or alternatively, where multiple beacon signals (e.g., from different access stations 110 in sleep mode) are detected, access eligibility checker 320 may grant access to wake up one access station (e.g., corresponding to a strongest signal) to avoid unnecessarily waking up multiple access stations.

Wake-up signal generator 330 may send a wake-up signal to access station 110. For example, if access eligibility checker 320 determines that UE device 190 passes the eligibility check, wake-up signal generator 330 may send a wake-up signal to wake up access station 110. Similar to the beacon signal from access station 110, the wake-up signal generated by UE device 190 may be a simple waveform, which may contain the tag/label for the targeted access station to wake up.

Process timer 340 may include a timer to delay initiation of normal cell searching and cell access procedures by UE device 190. Process timer 340 may be activated upon sending of a wake-up signal by wake-up signal generator 330. According to an implementation, process timer 340 may provide a configurable interval (e.g., 2-5 seconds after sending a wake-up signal) to enable access station 110 to begin normal operations before UE device 190 engages in conventional cell searching procedures.

Although FIG. 3 shows exemplary components of UE device 190, in other implementations, UE device 190 may include fewer components, different components, or additional components than depicted in FIG. 3. Additionally, or alternatively, one or more components of UE device 190 may perform functions described as being performed by one or more other components of UE device 190.

Figure 4:
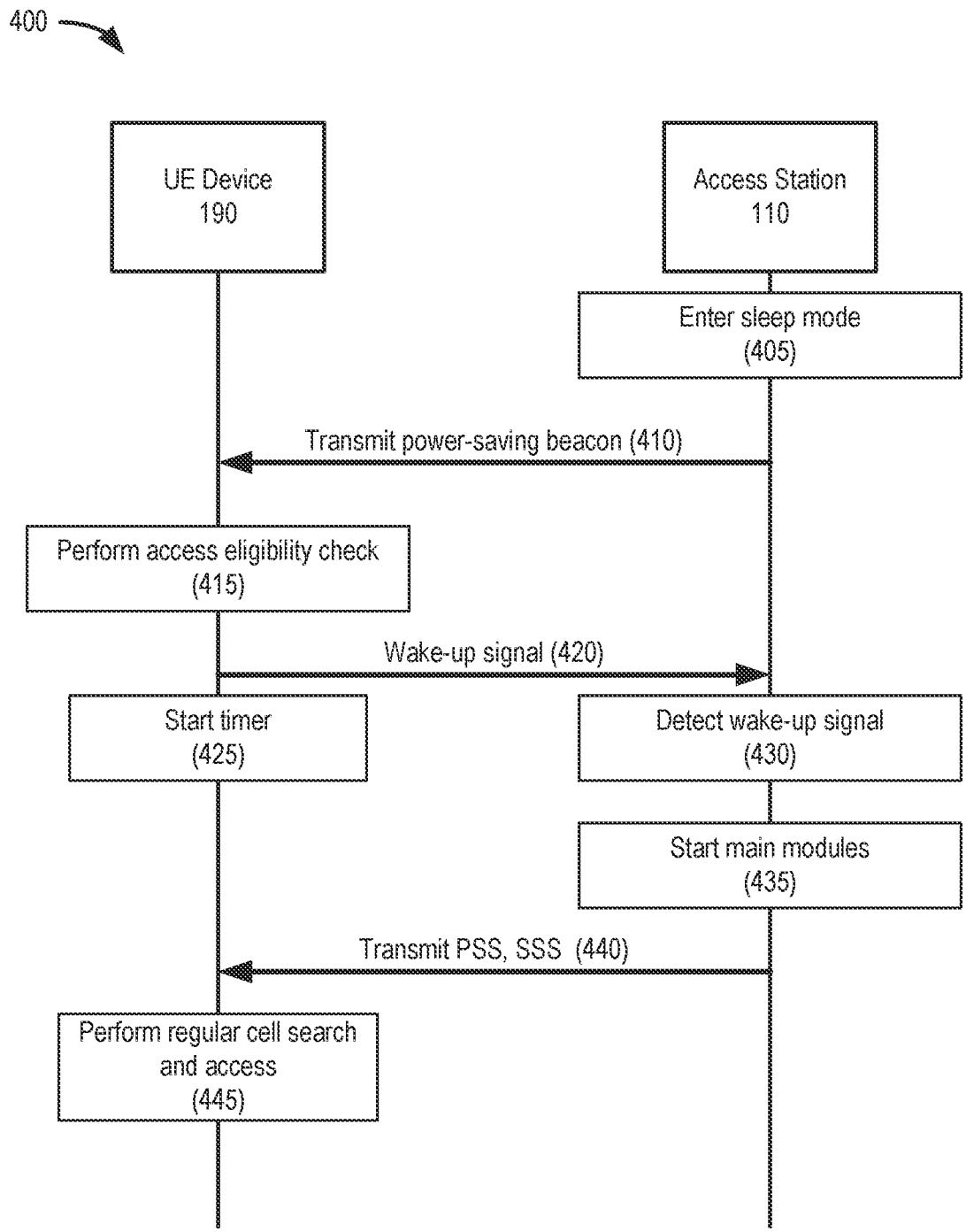
FIG. 4 is a block diagram illustrating exemplary communications to implement a reduced power consumption base station in another portion of the network environment of FIG. 1.

FIG. 4 is a diagram illustrating exemplary communications for implementing access station power saving in a portion 400 of network environment 100. FIG. 4 provides simplified illustrations of communications in network portion 400 and is not intended to reflect every signal or communication exchanged between devices/functions. Network portion 400 may include access station 110 and UE device 190.

As shown in FIG. 4, access station 110 may enter a sleep mode 405. For example, after a period of inactivity (e.g., when no UE devices 190 are being serviced by access station 110), sleep manager 240 may power down main access station components 210 and main antenna module 220 of access station 110. In response to entering sleep mode, access station 110 (e.g., power saving module 230) may begin transmitting a power-saving beacon signal 410. According to an implementation, beacon signal 410 may be a simple waveform and may contain limited information, such as a label and a power saving level for access station 110. For example, beacon signal 410 may include a predetermined sequence, such as Zadoff-Chu sequence, m-sequence, etc. As another example, beacon signal 410 may include a modulated signal of e.g., a tag or ID that may be transmitted constantly or at an interval.

When UE device 190 enters a coverage area/cell for access station 110, UE device 190 may receive power-saving beacon signal 410. In response to detecting power-saving beacon signal 410, UE device 190 may perform an access eligibility check 415. For example, based on the access category and AIN for UE device 190, access eligibility checker 320 may determine if UE device 190 is allowed to wake up access station 110 from sleeping mode.

Assuming access eligibility checker 320 determines that UE device 190 is eligible, UE device 190 (e.g., wake-up signal generator 330) may send a wake-up signal 420 to wake up access station 110. For example, wake-up signal 420 may include a predetermined sequence, such as Zadoff-Chu sequence, m-sequence, etc. As another example, wake-up signal 420 may include a modulated signal having frames with their length corresponding to the label or ID of the target access station 110.

Sending wake-up signal 420 may trigger process timer 340 to start timer 425, indicating an interval before UE 190 may begin normal RRM signal processing. As indicated at reference 430, access station 110 (e.g., power saving module 230) may detect wake-up signal 420. In response, as shown at reference 435, power saving module 230 may power up main access station components 210 and main antenna module 220 to start transmitting primary synchronization signals (PSS) and/or secondary synchronization signals (SSS) 440, as well as the single UE system information (SI). After the expiration of timer 425, UE device 190 may perform a regular cell search 445 to detect PSS/SSS 440 and eventually connect to access station 110.

Figure 5:
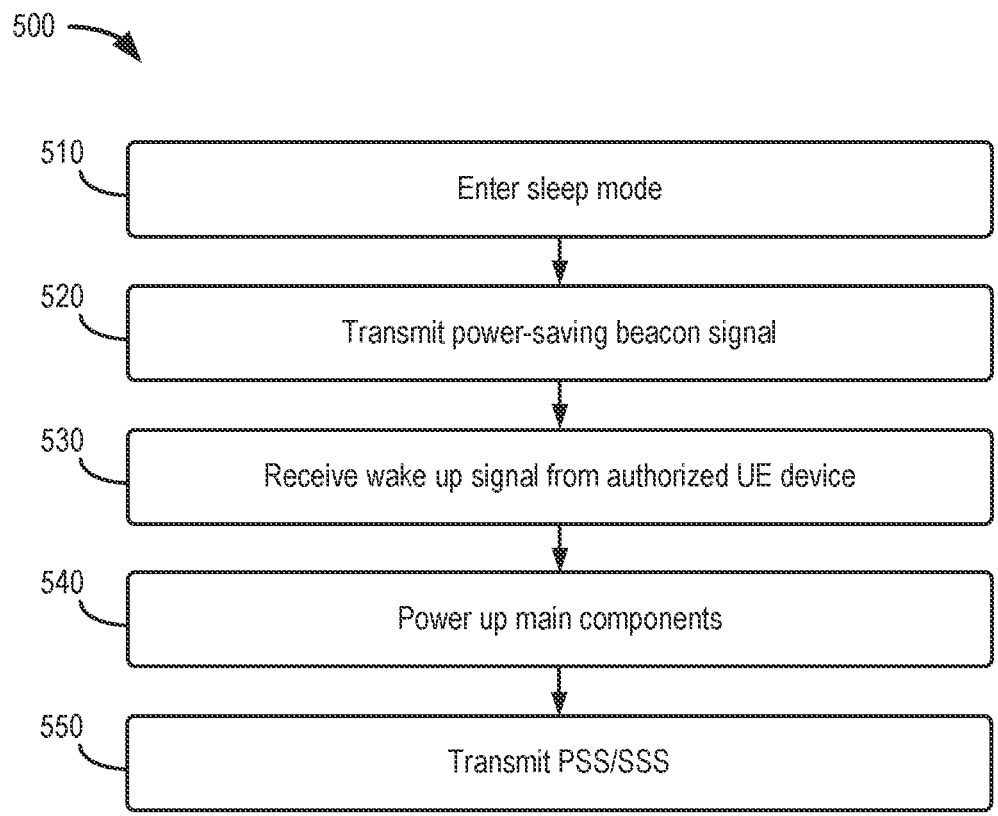
FIG. 5 is a flow diagram illustrating exemplary processes of providing a reduced power consumption base station in a radio access network, according to an implementation described herein.

FIG. 5 is a flow diagram illustrating exemplary processes 500 for optimizing power consumption by an access station. In one implementation, process 500 may be performed by power saving module 230. In another implementation, process 500 may be performed by power saving module 230 in conjunction with other elements of access station 110 and/or another network device in network environment 100.

Process 500 may include entering a sleep mode (block 510) and transmitting a power-saving beacon signal (block 520). For example, sleep manager 240 may detect a period of no utilization and power down primary components of access station 110 (e.g., main access station components 210 and main antenna module 220). In response to access station 110 entering a sleep mode, power saving module 230 may begin to regularly transmit a beacon signal (e.g., beacon signal 410). The beacon signal may include an access station ID/label and a power saving level.

Process 500 may also include receiving a wake-up signal from an authorized UE device (block 530), powering up main components (block 540), and transmitting PSS/SSS (block 550). For example, access station 110 (e.g., power saving module 230) may monitor for and receive a wake-up signal (e.g., wake-up signal 420) from a UE device 190 in the coverage area of access station 110. In response to detecting the wake-up signal, access station 110 may exit sleep mode. More particularly, power saving module 230 may signal sleep manager 240 to power up main access station components 210 and main antenna module 220, which may resume normal operation, including transmission of PSS and SSS.

Figure 6:
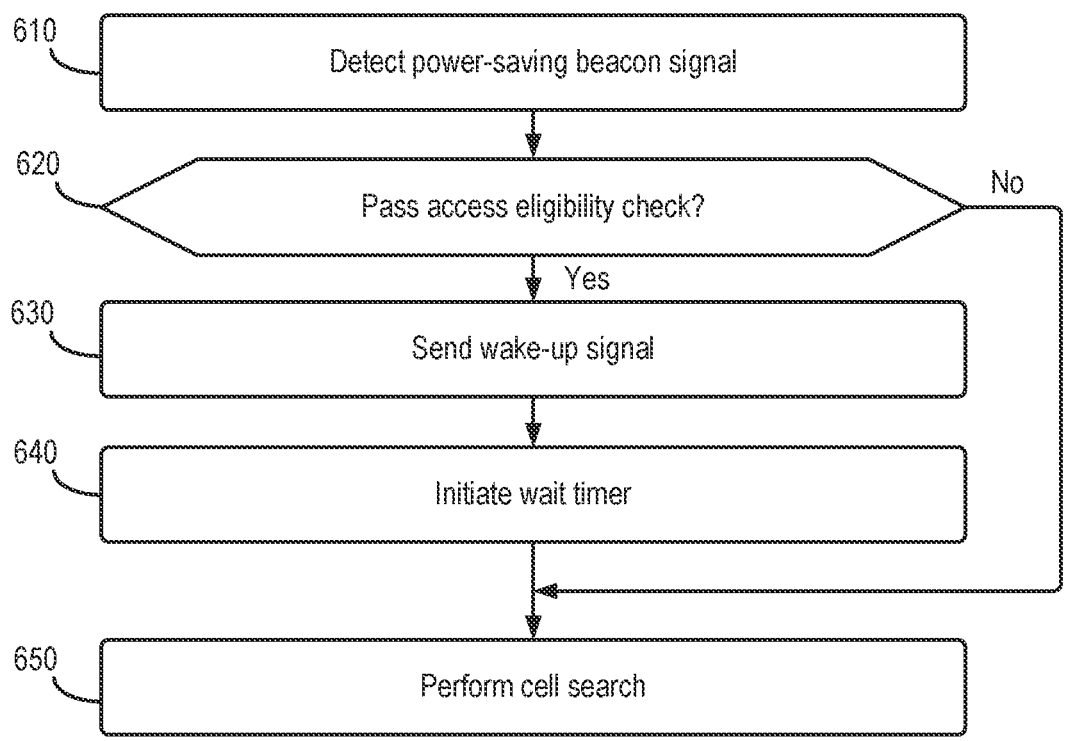
FIG. 6 is a flow diagram illustrating exemplary processes of interacting with a reduced power consumption base station in a radio access network, according to an implementation described herein.

FIG. 6 is a flow diagram illustrating exemplary processes 600 for connecting to an access station in a sleep mode. In one implementation, process 600 may be performed by UE device 190. In another implementation, process 600 may be performed by UE device 190 in conjunction with access station 110 and/or another network device in network environment 100.

Process 600 may include detecting a power-saving beacon signal from an access station (block 610), and determining if the UE device is eligible to wake-up the access station (block 620). For example, UE device 190 may enter a coverage area for an access station 110 that is currently in sleep mode (e.g., transmitting beacon signal 410). UE device 410 may detect the beacon signal and initiate an eligibility check to determine if UE device 190 is authorized to send a wake-up signal to access station 110. According to an implementation, the eligibility check may compare a power saving level indicted by beacon signal 410 with an assigned access class for UE device 190.

If the UE device is eligible to wake-up the access station (block 620—Yes), process 600 may include sending a wake-up signal to the access station (block 630) and initiating a wait timer (block 640). For example, UE device 190 may send wake-up signal 420 to access station 110. The wake-up signal may include the access station ID/label. In other implementations, the wake-up signal may include UE device information that may be used by access station 110 to provide power-optimized signaling. Sending wake-up signal 420 may cause UE device 190 to initiate a timer to pause typical RRM signaling while the access station 110 powers up.

If the UE device is not eligible to wake-up the access station (block 620—No) or after the timer of block 640 expires, process 600 may include performing a cell search (block 650). For example, UE device 190 may use conventional radio resource control (RRC) signaling to establish a connection with access station 110.

Figure 7:
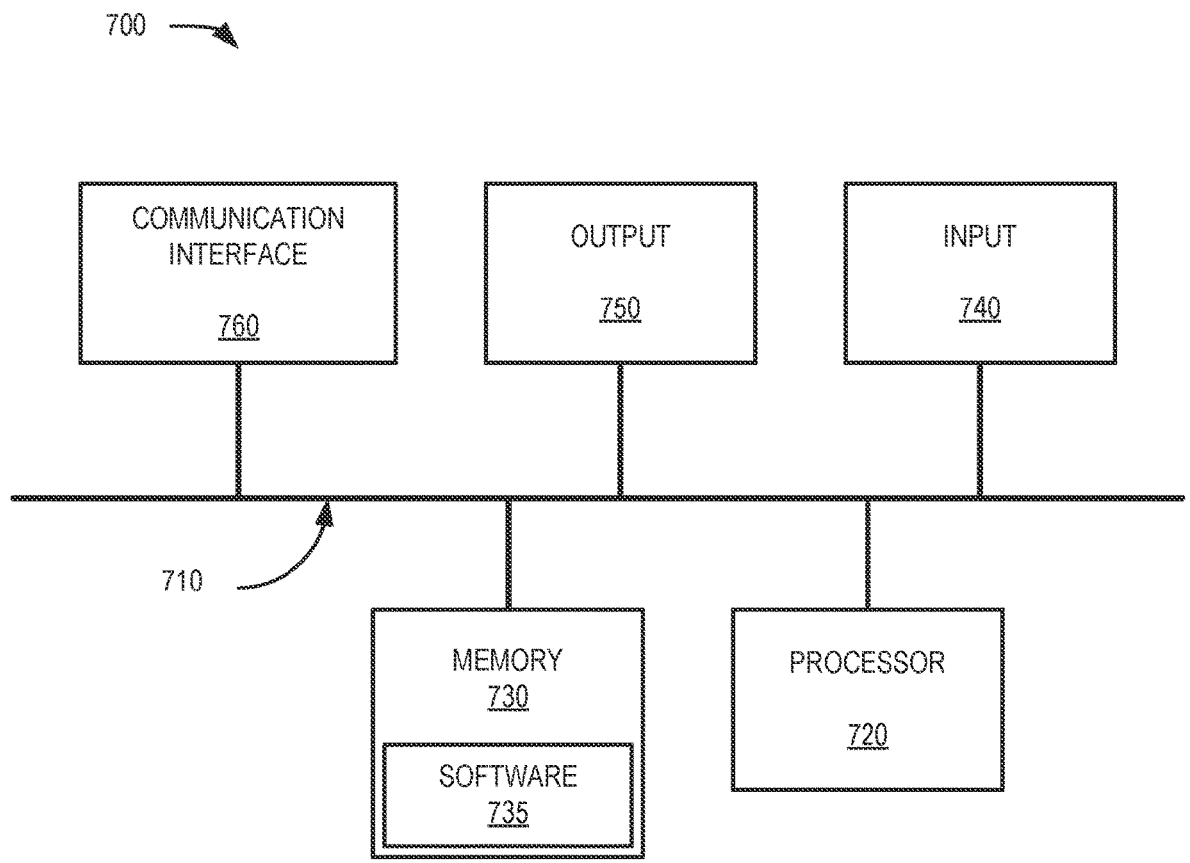
FIG. 7 is a block diagram illustrating exemplary components of a device that may correspond to one of the devices described herein.

FIG. 7 is a block diagram illustrating exemplary components of a device that may correspond to one of the devices described in FIGS. 1-6. Each of access station 110, UE device 190, and network devices for edge network 130 and/or core network 150 may be implemented as a combination of hardware and software on one or more of devices 700. As shown in FIG. 7, device 700 may include a bus 710, a processor 720, a memory 730 with software 735, an input device 740, an output device 750, and a communication interface 760.

Communication channel 710 may include a path that permits communication among the components of device 700. Processor 720 may include a processor, a microprocessor, or processing logic that may interpret and execute instructions. Memory 730 may include any type of dynamic storage device that may store information and instructions, for execution by processor 720, and/or any type of non-volatile storage device that may store information for use by processor 720.

Software 735 includes an application or a program that provides a function and/or a process. Software 735 is also intended to include firmware, middleware, microcode, hardware description language (HDL), and/or other form of instruction. By way of example, when device 700 is access station 110, software 735 may include instructions for sleep manager 240, as described herein.

Input device 740 may include a mechanism that permits a user to input information to device 700, such as a keyboard, a keypad, a button, a switch, touch screen, etc. Output device 750 may include a mechanism that outputs information to the user, such as a display, a speaker, one or more light emitting diodes (LEDs), etc.

Communication interface 760 may include a transceiver that enables device 700 to communicate with other devices and/or systems via wireless communications, wired communications, or a combination of wireless and wired communications. For example, communication interface 760 may include mechanisms for communicating with another device or system via a network. Communication interface 760 may include an antenna assembly for transmission and/or reception of radio frequency (RF) signals. For example, communication interface 760 may include one or more antennas to transmit and/or receive RF signals over the air. In one implementation, for example, communication interface 760 may communicate with a network and/or devices connected to a network. Alternatively or additionally, communication interface 760 may be a logical component that includes input and output ports, input and output systems, and/or other input and output components that facilitate the transmission of data to other devices.

Device 700 may perform certain operations in response to processor 720 executing software instructions (e.g., software 735) contained in a computer-readable medium, such as memory 730. A computer-readable medium may be defined as a non-transitory memory device. A non-transitory memory device may include memory space within a single physical memory device or spread across multiple physical memory devices. The software instructions may be read into memory 730 from another computer-readable medium or from another device. The software instructions contained in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

Device 700 may include fewer components, additional components, different components, and/or differently arranged components than those illustrated in FIG. 7. As an example, in some implementations, a display may not be included in device 700. As another example, device 700 may include one or more switch fabrics instead of, or in addition to, bus 710. Additionally, or alternatively, one or more components of device 700 may perform one or more tasks described as being performed by one or more other components of device 700.

Systems and methods described herein may allow access stations to save power when no UE devices require service from the access station. The access station may enter a low power-consumption mode (or "sleep mode") when the access station is inactive. The access station may transmit a beacon signal when in the low power-consumption mode to indicate to UE devices in a coverage area of the access station that the access station is in the low power-consumption mode. The access station may receive a wake-up signal from a UE device and, in response, may exit the low power-consumption mode to provide service to the UE device.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 720, etc.), or a combination of hardware and software (e.g., software 735).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 720) of a device. A non-transitory storage medium includes one or more of the storage mediums described in relation to memory 730.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A method, comprising:
   entering, by an access station for a radio access network (RAN), a low power-consumption mode that deactivates components of the access station;
   transmitting, by the access station, a beacon signal in response to entering the low power-consumption mode, wherein the beacon signal indicates that the access station is in the low power-consumption mode and includes a power-saving level that indicates a relative level of priority for the access station to remain in power saving mode;
   receiving, by the access station and based on the power-saving level, a wake-up signal from a user equipment (UE) device; and
   exiting, by the access station, the low power-consumption mode in response to receiving the wake-up signal.

2. The method of claim 1, wherein entering the low power-consumption mode is in response to detecting inactivity of the access station.

3. The method of claim 1, wherein the beacon signal indicates an identifier for the access station.

4. The method of claim 1, wherein the beacon signal includes a waveform that correlates to the power-saving level for the access station.

5. The method of claim 1, wherein the access station includes a low-power transceiver to transmit the beacon signal and to receive the wake-up signal.

6. The method of claim 5, wherein the low-power components include separate circuitry from a main antenna module of the access station.

7. The method of claim 1, wherein the wake-up signal indicates an identifier for the access station.

8. The method of claim 1, wherein the beacon signal includes a waveform that correlates to the wake-up signal.

9. The method of claim 1, further comprising:
   transmitting a primary synchronization signals (PSS) and a secondary synchronization signal (SSS) for the access station in response to exiting the low power-consumption mode.

10. The method of claim 1, wherein the power-saving level is an eligibility factor for a unified access control framework.

11. An access station comprising:
    one or more processors configured to:
      enter a low power-consumption mode that deactivates components of the access station;
      transmit a beacon signal in response to entering the low power-consumption mode, wherein the beacon signal indicates that the access station is in the low power-consumption mode and includes a power-saving level that indicates a relative level of priority for the access station to remain in power saving mode;
      receive, based on the power-saving level, a wake-up signal from a user equipment (UE) device; and
      exit the low power-consumption mode in response to receiving the wake-up signal.

12. The access station of claim 11, wherein the one or more processors are further configured to:
    detect inactivity of the access station prior to entering the low power-consumption mode.

13. The access station of claim 11, wherein the beacon signal indicates an identifier for the access station.

14. The access station of claim 11, wherein the beacon signal includes a waveform that correlates to the power-saving level for the access station.

15. The access station of claim 11, further comprising:
a low-power transceiver configured to transmit the beacon signal and receive the wake-up signal.

16. The access station of claim 15, wherein the low-power module includes a field-programmable gate array (FPGA) or an application-specific integrated circuit (ASIC).

17. The access station of claim 11, wherein the beacon signal indicates an identifier for the access station, and
wherein the wake-up signal indicates the identifier for the access station.

18. A non-transitory computer-readable medium storing instructions, which are executable by one or more processors, for:
entering, by an access station for a radio access network (RAN), a low power-consumption mode that deactivates components of the access station;
transmitting, by the access station, a beacon signal in response to entering the low power-consumption mode, wherein the beacon signal indicates that the access station is in the low power-consumption mode and includes a power-saving level that indicates a relative level of priority for the access station to remain in power saving mode;
receiving, by the access station and based on the power-saving level, a wake-up signal from a user equipment (UE) device; and
exiting, by the access station, the low power-consumption mode in response to receiving the wake-up signal.

19. The non-transitory computer-readable storage medium of claim 18, wherein the beacon signal includes a waveform that indicates the low power-consumption mode.

20. The non-transitory computer-readable storage medium of claim 18, wherein the wake-up signal indicates an identifier for the access station.

* * * * *